(12) United States Patent
Chang

(10) Patent No.: US 9,222,515 B2
(45) Date of Patent: Dec. 29, 2015

(54) LUBRICATING STRUCTURE FOR LINEAR MOTION GUIDE APPARATUS

(71) Applicant: Hiwin Technologies Corp., Taichung (TW)

(72) Inventor: Lung Yu Chang, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 31 days.

(21) Appl. No.: 14/183,702

(22) Filed: Feb. 19, 2014

(65) Prior Publication Data

US 2015/0233427 A1    Aug. 20, 2015

(51) Int. Cl.
| | | |
|---|---|---|
| F16C 33/66 | (2006.01) | |
| F16C 29/08 | (2006.01) | |
| F16C 29/06 | (2006.01) | |
| F16C 29/00 | (2006.01) | |

(52) U.S. Cl.
CPC ........... F16C 33/6659 (2013.01); F16C 29/005 (2013.01); F16C 29/06 (2013.01); F16C 29/086 (2013.01)

(58) Field of Classification Search
CPC ............. F16C 29/0607; F16C 29/0661; F16C 33/6681; F16C 33/6622; F16C 33/6659
USPC .................... 384/13, 43, 45, 49, 55
See application file for complete search history.

(56) References Cited

U.S. PATENT DOCUMENTS

| | | | |
|---|---|---|---|
| 4,253,709 A * | 3/1981 | Teramachi ...................... 384/45 |
| 4,428,627 A * | 1/1984 | Teramachi ...................... 384/45 |
| 4,582,369 A * | 4/1986 | Itoh ................................. 384/13 |
| 4,595,244 A * | 6/1986 | Teramachi ...................... 384/15 |
| 4,810,104 A * | 3/1989 | Matsuoka et al. .............. 384/45 |
| 4,921,358 A * | 5/1990 | Kasuga et al. .................. 384/15 |
| RE33,884 E * | 4/1992 | Kasuga et al. .................. 384/15 |
| 5,139,347 A * | 8/1992 | Hattori ............................ 384/15 |
| 6,729,760 B2 * | 5/2004 | Mochizuki et al. ............. 384/45 |
| 7,044,641 B2 | 5/2006 | Scotte et al. |
| 7,435,000 B2 * | 10/2008 | Neufang et al. ................ 384/45 |
| 7,553,084 B2 * | 6/2009 | Chen ............................... 384/45 |
| 7,556,430 B2 | 7/2009 | Wu et al. |
| 7,658,544 B2 | 2/2010 | Chen et al. |
| 7,686,514 B2 | 3/2010 | Hung et al. |
| 7,736,059 B2 | 6/2010 | Chen et al. |
| 8,070,360 B2 * | 12/2011 | Michioka et al. .............. 384/13 |
| 8,082,814 B2 | 12/2011 | Jiang et al. |
| 8,147,141 B2 * | 4/2012 | Fumoto et al. .................. 384/13 |
| 8,721,180 B2 * | 5/2014 | Li .................................... 384/13 |
| 2005/0213855 A1 * | 9/2005 | Shing-Neng et al. ........... 384/44 |
| 2009/0148083 A1 * | 6/2009 | Michioka et al. ............... 384/15 |

FOREIGN PATENT DOCUMENTS

JP         2004225758 A  *  8/2004  .............. F16C 29/06

* cited by examiner

*Primary Examiner* — Marcus Charles
(74) *Attorney, Agent, or Firm* — Charles E. Baxley

(57) ABSTRACT

A linear motion guide device includes a slider slidably attached onto a guide rail, the guide rail includes a number of recesses and the slider includes a number of depressions aligned with the recesses of the guide rail for forming a number of ball rolling passages, the slider includes a number of grooves offset from the depressions, two end caps attached onto the slider and each include a number of passageways communicating with the grooves of the slider and the ball rolling passages for forming a number of endless ball guiding raceways between the slider and the guide rail and the end caps and for slidably receiving and engaging with the ball bearing device.

7 Claims, 6 Drawing Sheets

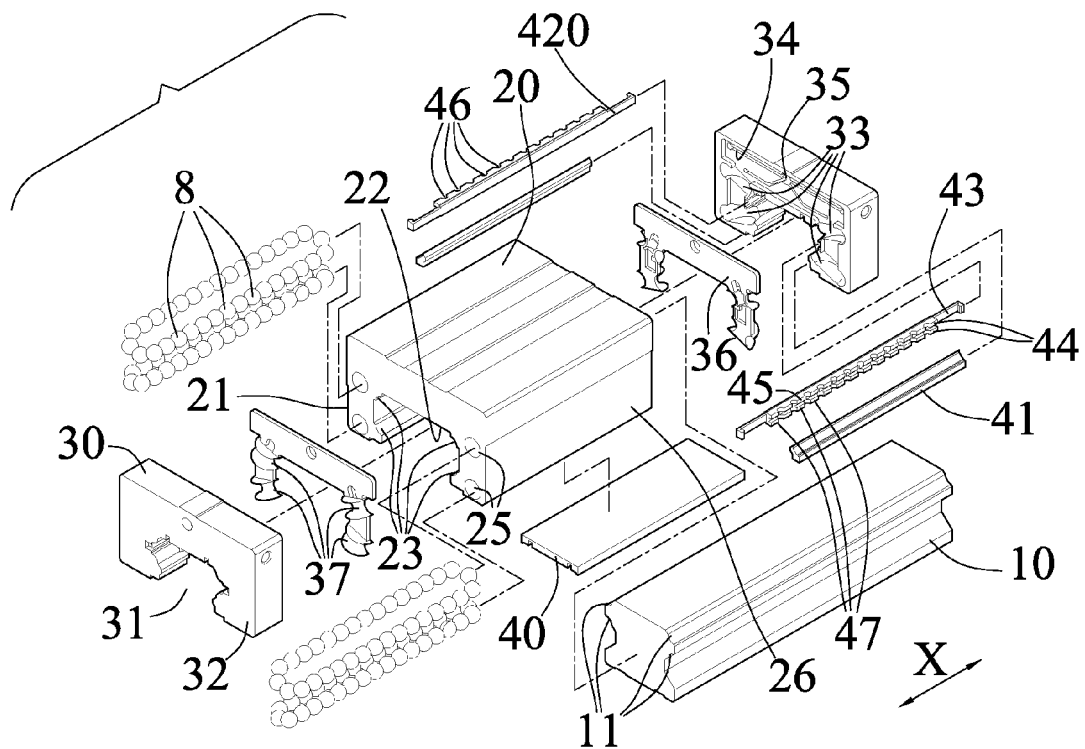
F I G. 7
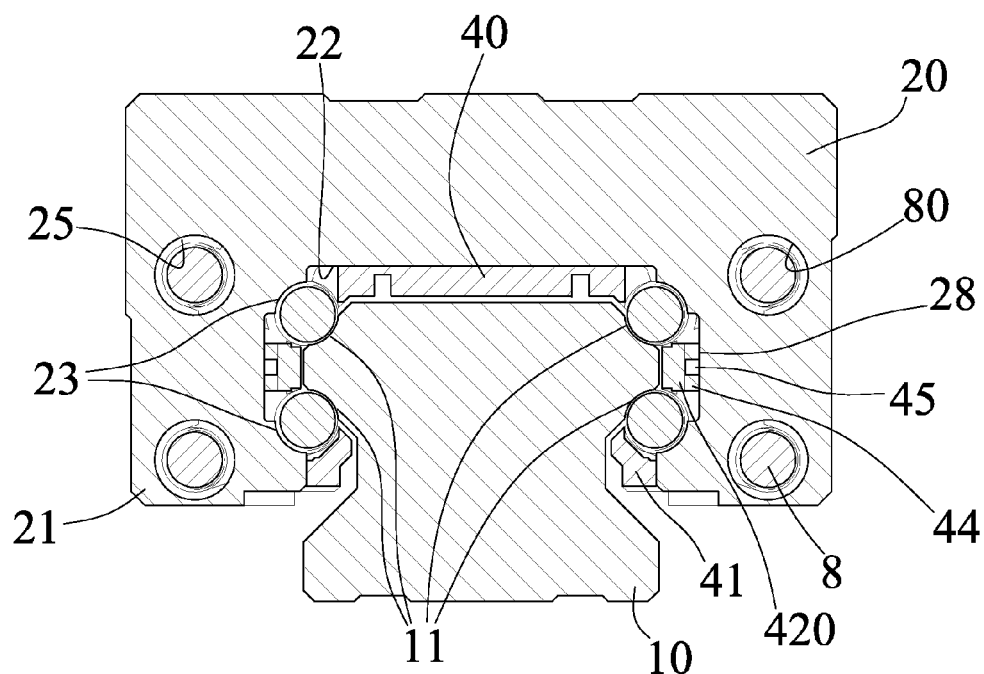
F I G. 8

LUBRICATING STRUCTURE FOR LINEAR MOTION GUIDE APPARATUS

BACKGROUND OF THE INVENTION

1. Field of the Invention

The present invention relates to a linear motion guide apparatus, and more particularly to a linear motion guide apparatus including a lubricating device or arrangement or structure designed and arranged for suitably and uniformly sending or applying or supplying the lubricant or lubricating oil or fluid to various portions or positions or locations of the linear motion guide apparatus and for uniformly applying or supplying the lubricant or lubricating oil or fluid to the moving pathway of the ball bearing device and for suitably lubricating the ball bearing device.

2. Description of the Prior Art

Various kinds of typical linear motion guide devices have been developed and comprise a slider or follower or slide block slidably attached onto a guide rail, and normally, a ball bearing device is disposed between the slider and the guide rail for facilitating the sliding movement between the slider and the guide rail and for allowing the slider and the guide rail to be smoothly moved relative to each other.

For example, the applicant has also developed various kinds of typical linear motion guide devices or apparatuses as disclosed in the following patents, U.S. Pat. No. 7,044,641 to Scotte et al., U.S. Pat. No. 7,556,430 to Wu et al., U.S. Pat. No. 7,658,544 to Chen et al., U.S. Pat. No. 7,686,514 to Hung et al., U.S. Pat. No. 7,736,059 to Chen et al., and U.S. Pat. No. 8,082,814 to Jiang et al. disclose several of the typical linear motion rolling guide units or devices or apparatuses each comprising a slider or slide block slidably attached onto a guide rail, and a ball bearing device disposed and engaged between the slider and the guide rail and engaged in the endless ball guiding raceway for facilitating the sliding movement between the slider and the guide rail and for allowing the slider and the guide rail to be smoothly moved relative to each other.

Normally, the slider and the guide rail and/or the ball bearing device are moved in a fast speed relative to each other, and a lubricating device is required to be provided or disposed or engaged in the slider and/or the guide rail for filling or supplying the lubricant or lubricating oil or fluid into the endless ball guiding raceway and the slider and for suitably lubricating the ball bearing device or the like.

However, the lubricant or lubricating oil or fluid is normally required to be filled or supplied into the endless ball guiding raceway with a greater or higher pressure, and the lubricant or lubricating oil or fluid may have a good chance to flow out through the gaps formed between the parts or elements of the linear motion guide apparatus. In addition, the lubricant or lubricating oil or fluid may not be suitably and uniformly sent or applied or supplied to various portions or positions or locations of the linear motion guide apparatus.

The present invention has arisen to mitigate and/or obviate the afore-described disadvantages of the conventional lubricating structures or devices for linear motion guide devices.

SUMMARY OF THE INVENTION

The primary objective of the present invention is to provide a linear motion guide apparatus including a lubricating device or arrangement or structure designed and arranged for suitably and uniformly sending or applying or supplying the lubricant or lubricating oil or fluid to various portions or positions or locations of the linear motion guide apparatus and for suitably lubricating the ball bearing device.

In accordance with one aspect of the invention, there is provided a linear motion guide apparatus comprising a guide rail including a number of longitudinal recesses formed therein, a slider slidably attached onto the guide rail for moving along the guide rail, the slider including two limbs extended therefrom for forming a chamber in the slider and for slidably engaging with the guide rail, the slider including a number of longitudinal depressions formed in the limbs and communicating with the chamber of the slider and aligned with the longitudinal recesses of the guide rail respectively for forming a number of ball rolling passages between the slider and the guide rail, the slider including a number of longitudinal grooves formed in the limbs and offset from the chamber of the slider, two end caps attached onto end portions of the slider respectively, the end caps each including a compartment formed between two legs for slidably engaging onto the guide rail, and each including a number of passageways formed in the legs and communicating with the compartment of the end cap, and each including a slot formed in the end cap and communicating with the passageways of the end cap for supplying a lubricating fluid from the slot of the end cap to the passageways of the end cap, the passageways of the end cap being communicating with the longitudinal grooves of the limbs of the slider and the depressions of the limbs and the recesses of the guide rail and the ball rolling passages respectively for forming a number of endless ball guiding raceways between the slider and the guide rail and the end caps, and a ball bearing device slidably received and engaged in the endless ball guiding raceways between the slider and the guide rail and the end caps for allowing the lubricating fluid to suitably lubricate the ball bearing device that is rolled or moved through the depressions of the limbs and the recesses of the guide rail and the ball rolling passages and the endless ball guiding raceways between the slider and the guide rail and the end caps respectively.

The end caps each include an inlet formed therein and communicating with the slot of the end cap for engaging with a mouth piece and for supplying the lubricating fluid from the inlet to the slot of the end cap and for suitably lubricating the ball bearing device.

Two positioning members may further be provided and attached to the end caps, and each positioning member including an inner surface faced toward an inner surface of the limb of the slider and spaced from the inner surface of the limb of the slider for forming a space between the slider and the positioning member, the space which is formed between the slider and the positioning member being communicating with the passageways of the end cap for receiving the lubricating fluid from the passageways of the end cap and for lubricating the ball bearing device which is moved through the ball rolling passages that are formed and located between the slider and the guide rail respectively.

The end caps each include a cover attached to an inner portion of the end cap and engaged between the slider and the end cap for blocking or enclosing or sealing the slot and the passageways of the end caps and for suitably retaining the lubricating fluid within the slot and the passageways of the end caps.

The covers each include a number of protrusions extended therefrom and directed toward and aligned with the passageways of the end cap respectively for forming a curved configuration for the passageways of the end cap and for suitably receiving and engaging with the ball bearing device.

The positioning members each include two flanges extended from the inner surface of each of the positioning members for forming a pathway between the flanges and for communicating with the passageways of the end cap and for receiving the lubricating fluid from the passageways of the end cap.

The positioning members each include a number of notches formed in the flanges for forming a number of projections and for communicating with the pathway of the positioning member and for selectively receiving the lubricating fluid from the passageways of the end cap.

The positioning members each include a V-shaped notch formed therein and communicating with the pathway of the positioning member and for selectively receiving the lubricating fluid from the passageways of the end cap and for suitably lubricating the ball bearing device.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 7 is another partial exploded view similar to FIG. 1, illustrating the other arrangement of the linear motion guide apparatus;

FIGS. 8, 9 are cross sectional views of the linear motion guide apparatus as shown in FIG. 7;

DETAILED DESCRIPTION OF THE PREFERRED EMBODIMENT

Figure 1:
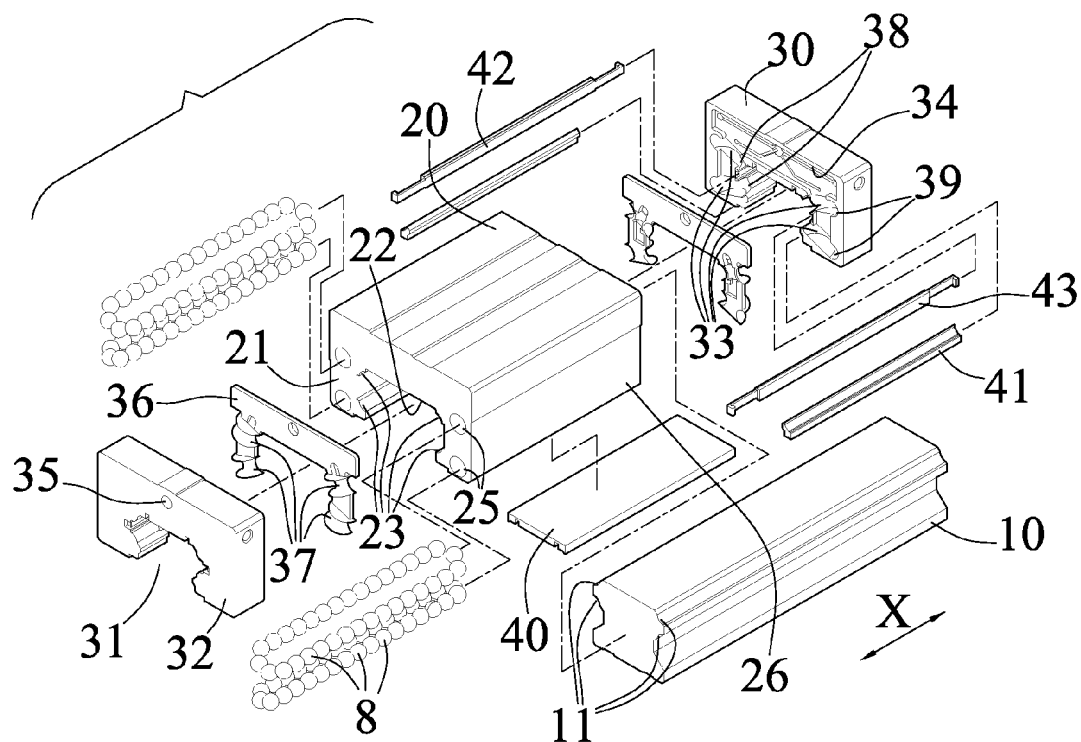
FIG. 1 is a partial exploded view of a linear motion guide apparatus in accordance with the present invention.
Figure 2:
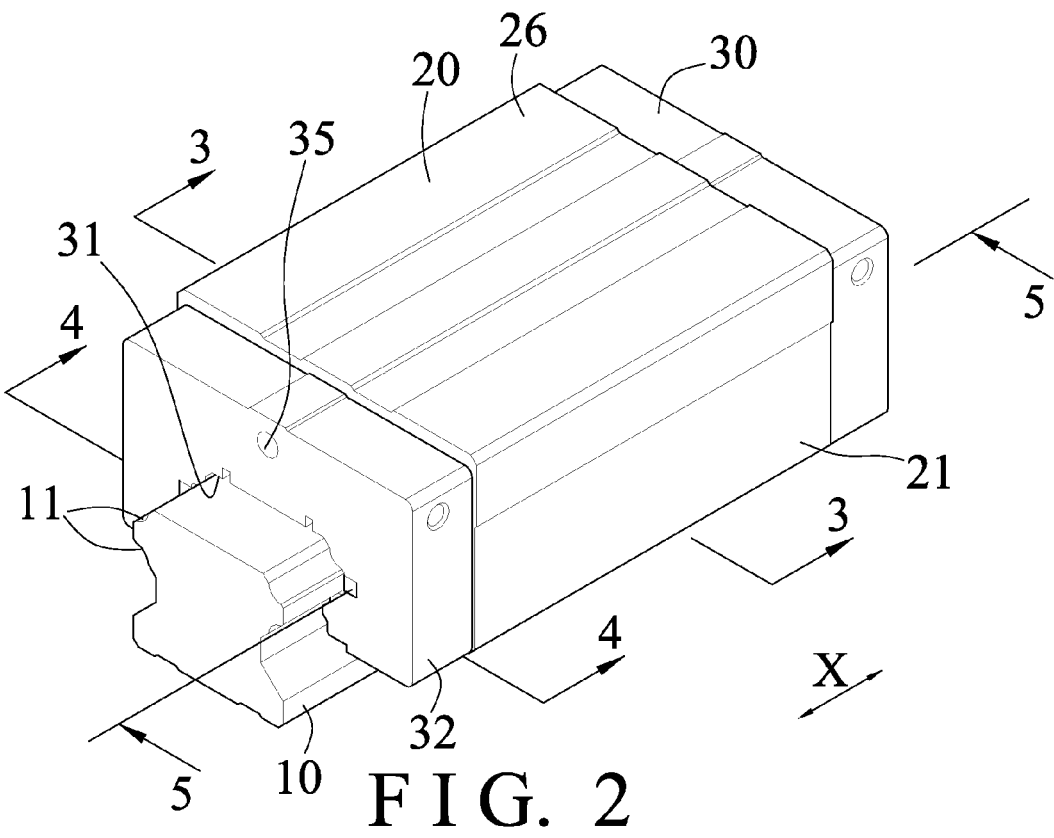
FIG. 2 is a perspective view of the linear motion guide apparatus.

Referring to the drawings, and initially to FIGS. 1-6, a linear motion guide apparatus in accordance with the present invention comprises a guide rail 10 including a substantially I-shaped cross section having one or more (such as two) pairs of, or one or more (such as four) longitudinal recesses 11 formed in the side portions thereof, a slide block or a slider 20 slidably attached onto the guide rail 10 and arranged to be moved along the guide rail 10, and normally, and a ball bearing device 8 (FIGS. 1, 3 and 5) to be disposed or attached or mounted or secured or engaged between the slider 20 and the guide rail 10 and engaged with the longitudinal recesses 11 of the guide rail 10 respectively for facilitating the sliding movement between the slider 20 and the guide rail 10 and for allowing the slider 20 and the guide rail 10 to be smoothly moved relative to each other.

The slider 20 includes two opposite legs or arms or extensions or limbs 21 extended downwardly therefrom for forming or defining a compartment or chamber 22 therein and for slidably receiving or engaging with the guide rail 10, and for guiding the slider 20 to smoothly and longitudinally move along or relative to the guide rail 10. The slider 20 further includes one or more (such as two) pairs of, or one or more (such as four) opposite and longitudinal projections or bulges or protrusions extended therefrom or longitudinal recesses or slots or grooves or depressions 23 formed therein, such as formed in the limbs 21 (FIGS. 1, 3) and communicating with the chamber 22 of the slider 20 and faced or directed toward and aligned with the longitudinal recesses 11 of the guide rail 10 respectively and for forming or defining one or more (such as two) pairs of, or one or more (such as four) ball rolling passages 24 (FIG. 3) between the slider 20 and the guide rail 10 and for slidably receiving or engaging with the ball bearing device 8.

The slider 20 further includes one or more (such as two) pairs of, or one or more (such as four) longitudinal slots or channels or grooves 25 formed therein, such as formed in the limbs 21 and offset or separated from the chamber 22 of the slider 20 also for slidably receiving or engaging with the ball bearing device 8. The linear motion guide apparatus in accordance with the present invention further includes two housings or casings or end caps 30 disposed or attached or mounted or secured onto the two sides or the outer portions or end portions 26 of the slider 20 respectively, the end caps 30 each include a chamber or compartment 31 formed in the lower portion thereof and formed or defined between two legs 32 for slidably receiving or engaging onto the guide rail 10 and for guiding the end caps 30 to smoothly move relative to the guide rail 10. The end caps 30 may be solidly and stably attached or mounted or secured to the slider 20 with catches or latches or fasteners (not illustrated) and moved in concert with the slider 20.

The end caps 30 each include one or more (such as two) pairs of, or one or more (such as four) curved depressions or recesses or passageways 33 formed therein, such as formed in the legs 32 and partially communicating with the compartment 31 of the end cap 30, and each include a manifold or passage or groove or slot 34 formed therein and communicating with the passageways 33 of the end cap 30 for receiving or obtaining the lubricant or lubricating oil or fluid from the slot 34 of the end cap 30, and each include an entrance or inlet 35 formed therein (FIGS. 1, 2 and 4) for engaging with a mouth piece (not illustrated) and for filling or supplying the lubricant or lubricating oil or fluid into the inlet 35 and the slot 34 and the passageways 33 of the end caps 30 (FIG. 4) and for lubricating the ball bearing device 8 that may be moved into or through the passageways 33 of the end caps 30.

The end caps 30 each further include an end plate or cover 36 attached or mounted or secured to the inner portion of the end cap 30 and to be disposed or arranged or located or engaged between the slider 20 and the end cap 30 for blocking or enclosing the slot 34 and the passageways 33 of the end caps 30, and the covers 36 each include one or more (such as two) pairs of, or one or more (such as four) curved projections or bulges or guide members or protrusions 37 extended therefrom (FIG. 1) and faced or directed toward and aligned with the passageways 33 of the end cap 30 respectively for forming or defining a curved shape or contour or structure or configuration for the passageways 33 of the end cap 30 and for suitably and slidably and smoothly receiving or engaging with the ball bearing device 8.

The passageways 33 of the end cap 30 each include a first end portion or first side or inner portion 38 (FIGS. 1 and 4) faced or directed toward and aligned with and communicating with the longitudinal depression 23 of the slider 20 and the longitudinal recess 11 of the guide rail 10 and/or the ball rolling passages 24 (FIG. 3) that are formed and located between the slider 20 and the guide rail 10 respectively, and a second or opposite end portion or side or outer portion 39 faced or directed toward and aligned with and communicating with the longitudinal grooves 25 of the slider 20 for communicating the ball rolling passages 24 and the grooves 25 of the slider 20 with each other and for forming or defining one or more (such as two) pairs of, or one or more (such as four) endless ball guiding raceways 80 between the slider 20 and the guide rail 10 and the end caps 30 and for slidably receiving or engaging with the ball bearing device 8.

The slider 20 further includes an upper anchoring or retaining or positioning member 40 attached or mounted or secured to the inner and upper portion thereof (FIG. 3) and disposed or provided or arranged or located above the guide rail 10, and contacted or engaged with the ball bearing device 8 for solidly and stably guiding the ball bearing device 8 to move through the ball rolling passages 24 (FIG. 3) that are formed and located between the slider 20 and the guide rail 10 respectively; and further includes one or more (such as two) further or lower anchoring or retaining or positioning members 41 attached or mounted or secured to the inner and lower portion of the slider 20 for contacting or engaging with the ball bearing device 8 and for solidly and stably guiding the ball bearing device 8 to move through the ball rolling passages 24 that are formed and located between the slider 20 and the guide rail 10 respectively.

Figure 5:
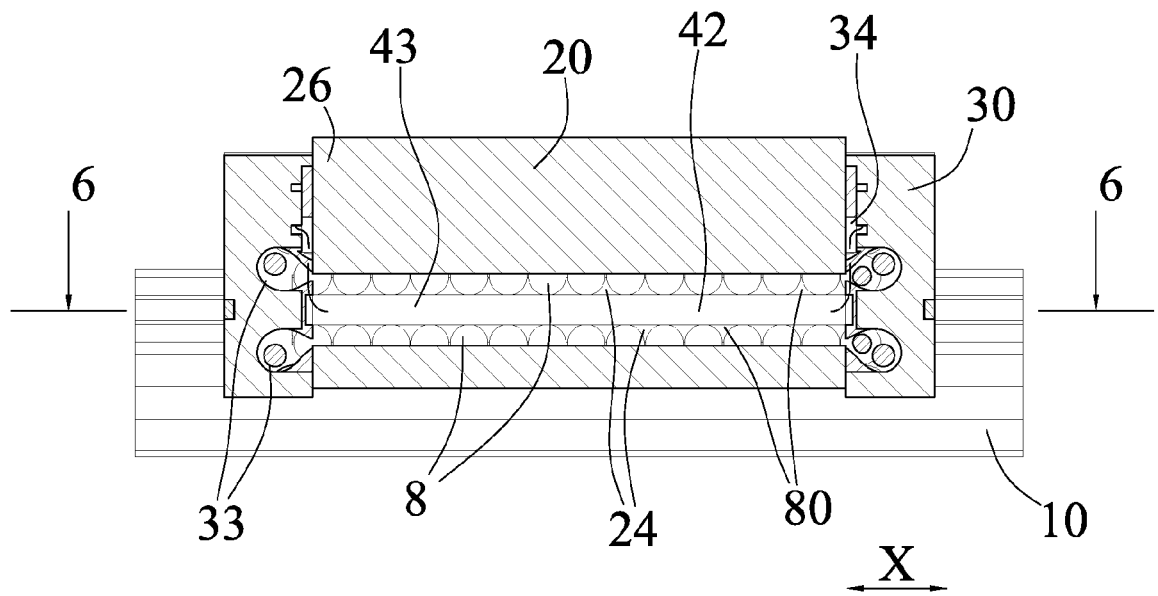
FIG. 5 is a cross sectional view of the linear motion guide apparatus taken along lines 5-5 of FIG. 2.
Figure 6:
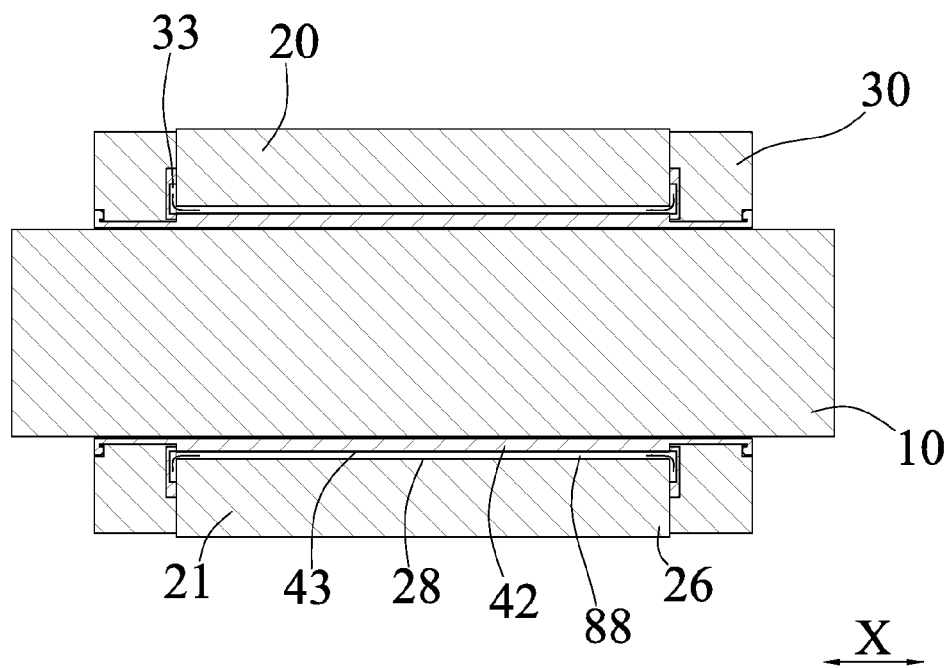
FIG. 6 is a cross sectional view of the linear motion guide apparatus taken along lines 6-6 of FIG. 5.

The slider 20 further includes one or more (such as two) further or middle or intermediate anchoring or retaining or positioning members 42 attached or mounted or secured to the inner and middle or intermediate portion of the slider 20 for contacting or engaging with the ball bearing device 8 and for solidly and stably guiding the ball bearing device 8 to move through the ball rolling passages 24 that are formed and located between the slider 20 and the guide rail 10 respectively, for example, as shown in FIG. 6, the middle or intermediate positioning members 42 are attached or mounted or secured to the end caps 30, and each include an inner portion or surface 43 (FIGS. 1, 3, 5-6) faced or directed toward and spaced or disengaged or separated from the inner portion or surface 28 of the limbs 21 of the slider 20 (FIGS. 3, 6) for forming or defining a gap or slit or slot or space 88 between the slider 20 and the middle or intermediate positioning member 42.

The space 88 which is formed or defined between the slider 20 and the middle or intermediate positioning member 42 (FIGS. 3, 4) is communicating with the inner portion 38 of the passageways 33 of the end cap 30 (FIGS. 5, 6) for receiving or obtaining the lubricant or lubricating oil or fluid from the passageways 33 of the end cap 30, and for lubricating the ball bearing device 8 which may be moved into or through the ball rolling passages 24 that are formed and located between the slider 20 and the guide rail 10 respectively, and thus for allowing most of the ball bearing device 8 to be suitably and uniformly and effectively lubricated with the lubricant or lubricating oil or fluid, and for preventing the ball bearing device 8 from not being suitably and uniformly lubricated with the lubricant or lubricating oil or fluid.

Figure 3:
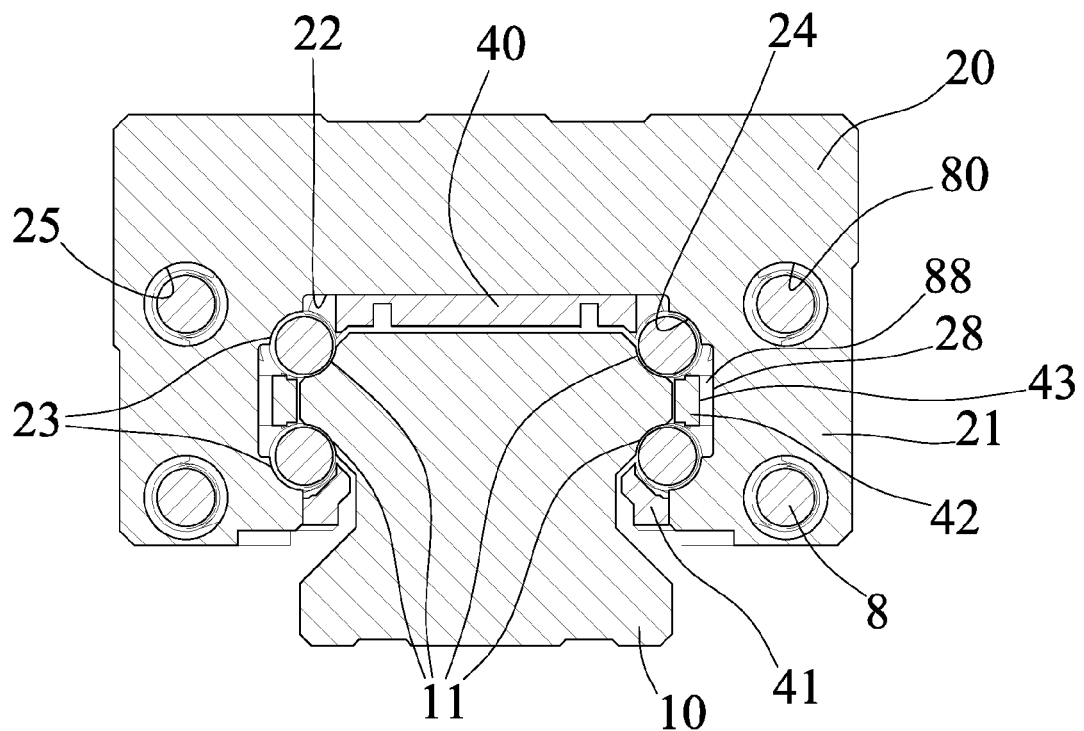
FIG. 3 is a cross sectional view of the linear motion guide apparatus taken along lines 3-3 of FIG. 2.
Figure 4:
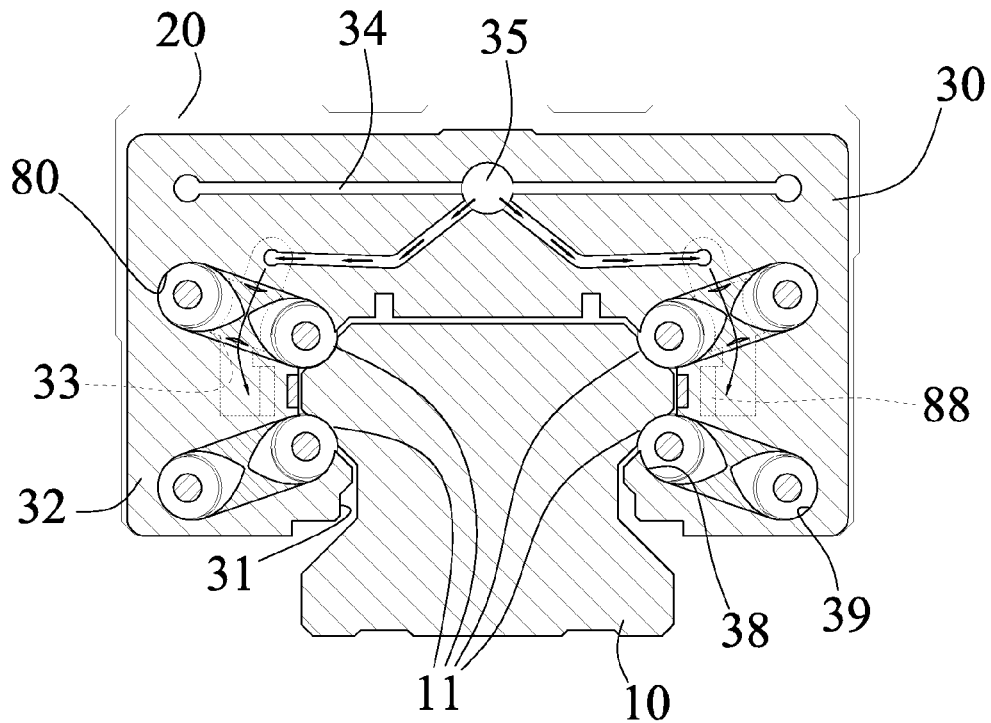
FIG. 4 is a cross sectional view of the linear motion guide apparatus taken along lines 4-4 of FIG. 2.

In operation, as shown in FIGS. 3-6, the middle or intermediate positioning members 42 may be contacted or engaged with the ball bearing device 8 for solidly and stably anchoring or retaining or positioning the ball bearing device 8 within the ball rolling passages 24 (FIG. 3) that are formed and located between the slider 20 and the guide rail 10 respectively, and thus for solidly and stably guiding the ball bearing device 8 to move through the ball rolling passages 24 that are formed and located between the slider 20 and the guide rail 10 respectively, the inner surfaces 43 of the middle or intermediate positioning members 42 are spaced or disengaged or separated from the inner surface 28 of the limbs 21 of the slider 20 (FIGS. 3, 6) for forming the space 88 between the slider 20 and the middle or intermediate positioning member 42 and for receiving or obtaining the lubricant or lubricating oil or fluid from the passageways 33 of the end cap 30, and for directly applying the lubricant or lubricating oil or fluid to lubricate the ball bearing device 8 (FIGS. 3, 5).

Figure 9:
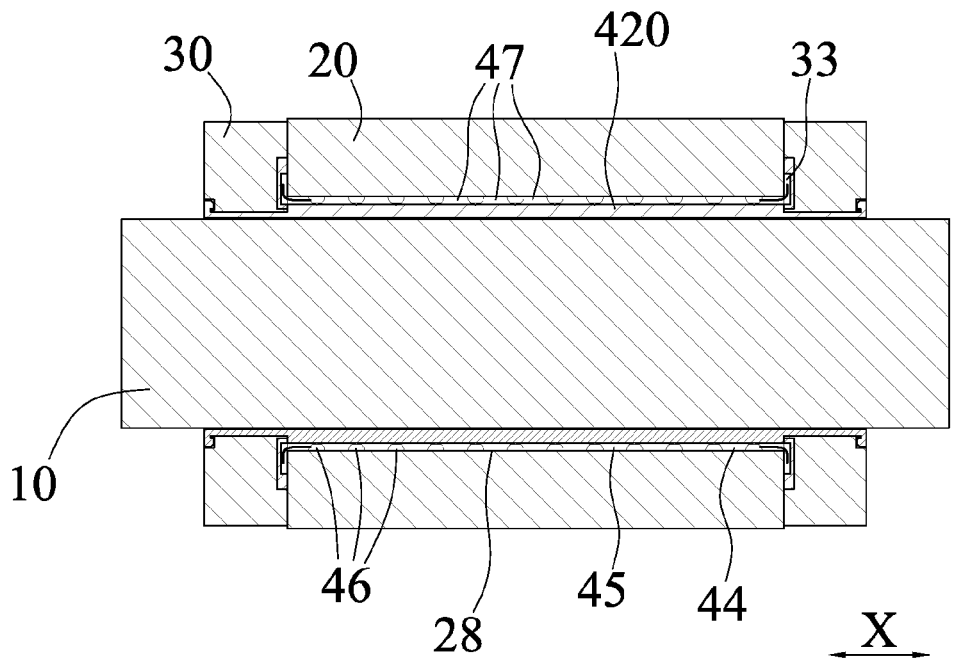

Alternatively, as shown in FIGS. 7-9, the positioning members 420 each include one or more (such as two) longitudinal ribs or projections or bulges or protrusions or flanges 44 extended from the inner portion or surface 43 thereof for forming or defining a gap or slit or slot or space or pathway 45 between the flanges 44 and for communicating with the passageways 33 of the end cap 30, and for receiving or obtaining the lubricant or lubricating oil or fluid from the passageways 33 of the end cap 30, and for applying the lubricant or lubricating oil or fluid to suitably and effectively lubricate the ball bearing device 8, the flanges 44 each include a number of recesses or slots or cavities or depressions or notches 46 formed therein for forming or defining a number of bulges or protrusions or projections 47 and for communicating with the pathway 45 of the positioning member 420.

Figure 10:
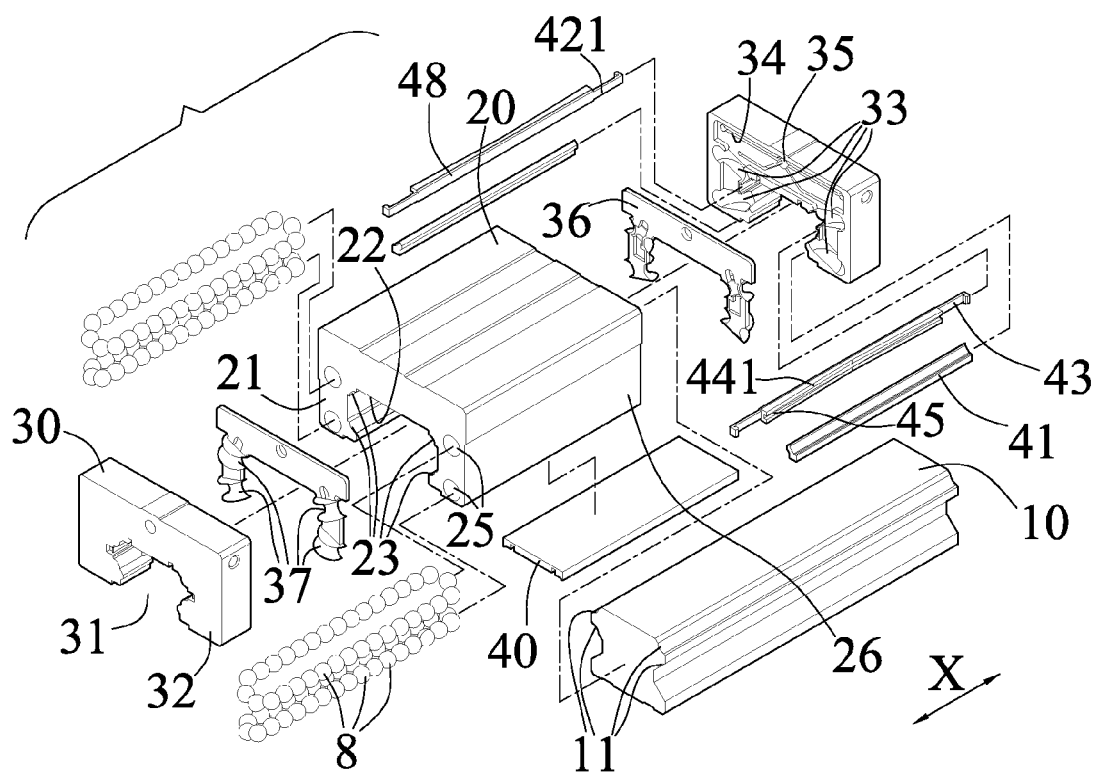
FIG. 10 is a further partial exploded view similar to FIGS. 1 and 7, illustrating the further arrangement of the linear motion guide apparatus.
Figure 11:
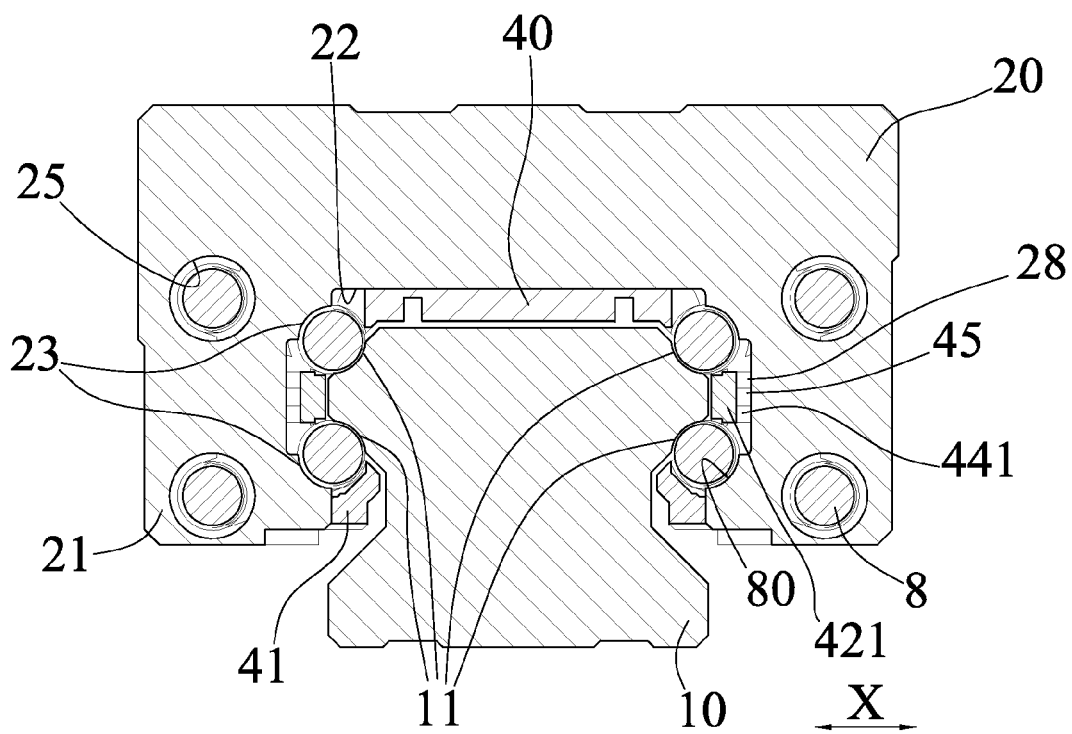
FIGS. 11 and 12 are cross sectional views of the linear motion guide apparatus as shown in FIG. 10.
Figure 12:
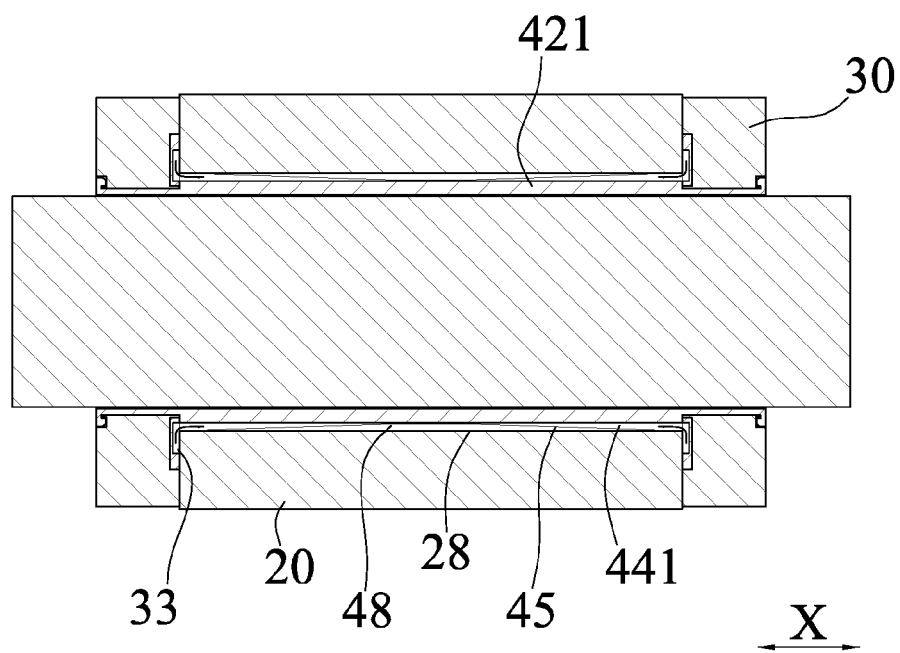

Further alternatively, as shown in FIGS. 10-12, the positioning members 421 each include one or more (such as two) longitudinal ribs or projections or bulges or protrusions or flanges 441 extended from the inner portion or surface 43 thereof for forming or defining a gap or slit or slot or space or pathway 45 between the flanges 441 and for communicating with the passageways 33 of the end cap 30, and for receiving or obtaining the lubricant or lubricating oil or fluid from the passageways 33 of the end cap 30, and for applying the lubricant or lubricating oil or fluid to suitably and effectively lubricate the ball bearing device 8, the flanges 441 each include a V-shaped recess or cavity or depression or notch 48 formed therein for communicating with the pathway 45 of the positioning member 421.

Accordingly, the linear motion guide apparatus in accordance with the present invention includes a lubricating device or arrangement or structure designed and arranged for suitably and uniformly sending or applying or supplying the lubricant or lubricating oil or fluid to various portions or positions or locations of the linear motion guide apparatus and for suitably lubricating the ball bearing device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A linear motion guide apparatus comprising:
   a guide rail including a plurality of longitudinal recesses formed therein,
   a slider slidably attached onto said guide rail for moving along said guide rail, said slider including two limbs extended therefrom for forming a chamber in said slider and for slidably engaging with said guide rail, said slider including a plurality of longitudinal depressions formed in said limbs and communicating with said chamber of said slider and aligned with said longitudinal recesses of said guide rail respectively for forming a plurality of ball rolling passages between said slider and said guide rail, said slider including a plurality of longitudinal grooves formed in said limbs and offset from said chamber of said slider, two end caps attached onto end portions of said slider respectively, said end caps each including a compartment formed between two legs for slidably engaging onto said guide rail, and each including a plurality of passageways formed in said legs and communicating with said compartment of said end cap, and each including a slot formed in said end cap and communicating with said passageways of said end cap for supplying a lubricating fluid from said slot of said end cap to said passageways of said end cap, said passageways of said end cap being communicating with said longitudinal grooves of said limbs of said slider and said depressions of said limbs and said recesses of said guide rail and said ball rolling passages respectively for forming a plurality of endless ball guiding raceways between said slider and said guide rail and said end caps, two positioning members attached to said end caps, and each positioning member including an inner surface faced toward an inner surface of said limb of said slider and spaced from said inner surface of said limb of said slider for forming a space between said slider and said positioning member, said space which is formed between said slider and said positioning member being communicating with said passageways of said end cap for receiving the lubricating fluid from said passageways of said end cap and for lubricating said ball bearing device which is moved through said ball rolling passages that are formed and located between said slider and said guide rail respectively, and a ball bearing device slidably received and engaged in said endless ball guiding raceways between said slider and said guide rail and said end caps.

2. The linear motion guide apparatus as claimed in claim 1, wherein said end caps each include an inlet formed therein and communicating with said slot of said end cap for supplying the lubricating fluid from said inlet to said slot of said end cap.

3. The linear motion guide apparatus as claimed in claim 1, wherein said end caps each include a cover attached to an inner portion of said end cap and engaged between said slider and said end cap for blocking said slot and said passageways of said end caps.

4. The linear motion guide apparatus as claimed in claim 3, wherein said covers each include a plurality of protrusions extended therefrom and directed toward and aligned with said passageways of said end cap respectively for forming a curved configuration for said passageways of said end cap.

5. The linear motion guide apparatus as claimed in claim 1, wherein said positioning members each include two flanges extended from said inner surface of each of said positioning members for forming a pathway between said flanges and for communicating with said passageways of said end cap.

6. The linear motion guide apparatus as claimed in claim 5, wherein said positioning members each include a plurality of notches formed in said flanges for forming a plurality of projections and for communicating with said pathway of said positioning member.

7. The linear motion guide apparatus as claimed in claim 5, wherein said positioning members each include a V-shaped notch formed therein and communicating with said pathway of said positioning member.

* * * * *